United States Patent [19]
Ashizaki

[11] 3,989,977
[45] Nov. 2, 1976

[54] COLOR PICTURE TUBE
[75] Inventor: Shigeya Ashizaki, Takatsuki, Japan
[73] Assignee: Matsushita Electronics Corporation, Kadoma, Japan
[22] Filed: Mar. 26, 1975
[21] Appl. No.: 562,056

[30] Foreign Application Priority Data
Apr. 5, 1974  Japan................................ 49-39103

[52] U.S. Cl................................. 313/468; 313/473
[51] Int. Cl.² ..................... H01J 29/20; H01J 29/10
[58] Field of Search...................... 313/468, 503, 473

[56] References Cited
UNITED STATES PATENTS

| | | | |
|---|---|---|---|
| 3,791,844 | 2/1974 | Tecotzky et al. ............... | 313/468 X |
| 3,875,449 | 4/1975 | Byler et al. ..................... | 313/468 X |

*Primary Examiner*—Robert Segal
*Attorney, Agent, or Firm*—Cushman, Darby & Cushman

[57] ABSTRACT

In a color picture tube having a phosphor screen with three kinds, i.e., red, blue and green phosphor dots or phosphor strips, the red phosphor dots or strips are formed by employing europium-activated yttrium oxide ($Y_2O_3$:Eu) phosphor powder, each particle of which powder is coated with thin layer of europium-activated oxysulfide ($Y_2O_2S$:Eu) phosphor. By means of such thin coating of the oxysulfide phosphor, the conventional adverse active characteristic of $Y_2O_3$:Eu against photo-hardening agent in the phosphor slurry used in forming phosphor screen is eliminated, thereby increasing the uniformity of the red light emission and decreasing the U-V light exposure time in the screen forming process.

2 Claims, 2 Drawing Figures

COLOR PICTURE TUBE

BACKGROUND OF THE INVENTION

This invention relates to an improvement in a phosphor screen of a color picture tube.

As is well known, in the conventional color picture tubes, rare earth phosphors are used as red phosphor. For instance, red phosphor slurry for use in forming red dots or strips on the picture screen is prepared by mixing water, polyvinylalcohol, phosphor powder of $Y_2O_3$:Eu or $Y_2O_2S$:Eu together, to form a slurry of suitable viscosity, and then a photosensitive activating agent consisting of ammonium bichromate is added. The phosphor dots or strips are formed by applying the slurry on the picture screen, i.e., the inner face of the face plate, drying the slurry to form a film, exposing the film to photochemical rays through apertures of a shadowmask, and then developing the film to form dots or strips at the exposed places.

It is generally known that the europium-activated yttrium oxide phosphor ($Y_2O_3$:Eu) has high luminosity in red emission. However, the $Y_2O_3$:Eu phosphor has a shortcoming that it is liable to adverse hydrolysis when blended with the ammonium bichromate. By means of the hydrolysis, the photosensitivity for the photochemical rays of polyvinyl alcohol activated by the ammonium bichromate is considerably decreased. Therefore, the phosphor slurry changes to necessitate very long exposure time. Furthermore, chromium ions produced on the surface of the phosphor are not easily washed out by the subsequent developing, i.e., washing process after the exposure, and when heated in the subsequent process, are diffuse deep into the phosphor particle through, for instance, lattice imperfections. On account of this chromium-contamination, the phosphor is partly decomposed to change its characteristic and decreases luminosity. Furthermore, $Y_2O_3$:Eu phosphor is less hydrophilic, and therefore, is difficult to be sufficiently dispersed in the slurry, and is likely to produce specks on red phosphor emission. Though it is known that addition of a suitable Ca-compound and/or Ba-compound in a manner to coat the phosphor particle is useful in alleviating the hydrolysis, such art is not satisfactory in eliminating the shortcoming.

Another known method for alleviating the shortcoming is to add water glass as a dispersing agent, but the employment of the water glass causes gel formation and damages characteristic of the phosphor slurry.

On the other hand, $Y_2O_2S$:Eu phosphor does not have the abovementioned shortcomings like of $Y_2O_3$:Eu phosphor, but has insufficient luminosity.

Summary of the Invention

This invention purposes to provide a novel phosphor screen with an improved phosphor composition.

DETAILED DESCRIPTION OF THE INVENTION

Figure 1:
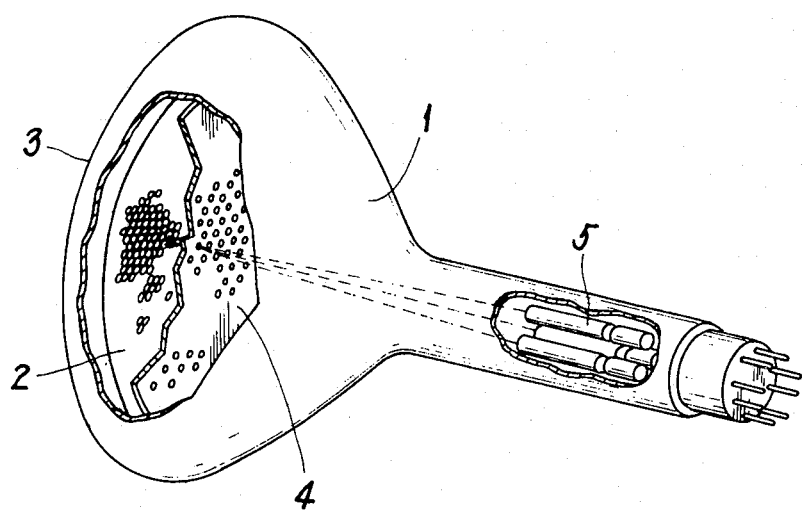
FIG. 1 is a fragmental perspective view of a color picture tube.

In FIG. 1 which shows one example of the present invention, a vacuum enclosure 1 contains a phosphor screen 2 on the inner surface of a face panel 3, a shadow mask 4 having a number of apertures and disposed with a specified gap from the phosphor screen 2, and an electron beam emitting means 5 comprising three units of electron guns.

The phosphor screen 2 comprizes a number of blue phosphor dots, green phosphor dots and red phosphor dots disposed in a specified pattern. In case a shadow mask has a row of slots, the abovementioned phosphor dots are phosphor strips.

Figure 2:
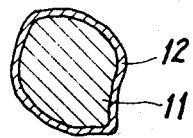
FIG. 2 is an enlarged sectional view of a particle of phosphor powder of the present invention.

The phosphor of the red phosphor dots or strips has a structure as elucidated referring to FIG. 2, wherein each particle 11 of red emitting phosphor powder of $Y_2O_3$:Eu is coated with thin layer 12 of $Y_2O_2S$:Eu phosphor. By such layer of $Y_2O_2S$:Eu the coated phosphor particle acquires stability in a photosensitive slurry containing ammonium bichromate and polyvinyl alcohol. Namely, the red emission phosphor consisting of $Y_2O_3$:Eu particles, each coated with thin $Y_2O_2S$:Eu layer, are not hydrolyzed nor are hydrophobic in the abovementioned slurry. Therefore, the phosphor slurry has normal photosensitivity of hardening by an exposure to photochemical light such as ultraviolet light.

Moreover, the phoshor prepared in the abovementioned way is not contaminated by chromium ions because of its stable characteristic, and therefore, the phosphor dots or strips formed with this phosphor have sufficient luminosity at electron beam excitation.

When the abovementioned phosphor particles are shot by an electron beam, $Y_2O_2S$:Eu phosphor of the coating layer 12 is excited, and further, the electrons which have penetrated the coating layer 12 reach the inside phosphor particle 11 of $Y_2O_3$:Eu and excite it. Thus, the coating layer 12 not only protects the inside phosphor particle 11 from hydrolytic reaction with the amnonium bichromate, but also emits red light which is very close in spectrum characteristic to the inside phosphor $Y_2O_3$:Eu. Therefore, the effect of the coating layer 12 is much more advantageous than the aforementioned conventional protecting coating layer of compound of Ca or Ba, which causes an energy loss of the electron beam and does not per se emit light.

The thicker the coating layer 12 is, the better the chemically protecting function of the layer 12 becomes and the lower the total emission of the composite phosphor particles. The practical penetration of electron beam, which is accelerated by 10 kilo-volt voltage, through the coating layer 12 is possible for the layer thickness below 1 to 2 $\mu$ (microns). In ordinary picture tubes, the accelerating voltage is usually 20 to 30 kilo-volts, and therefore, the coating layer 12 should be thinner than 3 $\mu$, and preferably between 0.5 $\mu$ to 2 $\mu$ for ordinary picture color tubes. For the $Y_2O_3$:Eu phosphor particle 11 coated with $Y_2O_2S$:Eu coating layer 12, the empirical result shows that the phosphor is chemically stable and well dispersed in the slurry, and the phosphor dots or strips formed with said slurry have a luminosity almost equal to that of intrinsic luminosity of the $Y_2O_3$:Eu phosphor.

The abovementioned $Y_2O_2S$:Eu coating layer 12 can be formed by firing the $Y_2O_3$:Eu phoshor in $H_2S$ gas flow. The thickness of the coating layer 12 can be controlled by controlling the time to contact the $H_2S$ gas and/or by controlling the firing temperature.

EXAMPLE $Y_2O_3$:Eu phosphor powder mainly consisting of phosphor particles 11 of about 6 $\mu$ diameter, is heated at about 1200° C, and is exposed in $H_2S$ gas flow of 1l/minute rate for 300 gram of the phosphor. Then, on the surface of the phosphor particle, thin layer 12 of $Y_2O_2S$:Eu phosphor is formed. The thickness of the layer 12 becomes 0.3 $\mu$ by 20 minutes' reaction between the phosphor and $H_2S$ gas, 0.7 $\mu$ by 40 minutes' reaction and 1.6 $\mu$ by 60 minutes' reaction. Therefore, by the reaction in the gas flow for 30 to 70 minutes, the layer 12 becomes about 0.5 to 2 $\mu$ thick.

Blue and green phosphor dots or strips are formed with known conventional phosphors.

What is claimed is:

1. In a cathode ray tube having a vacuum enclosure, a phosphor screen provided on the inner face of a face plate contained within the vacuum enclosure, the phosphor screen provided with a plurality of red, green and blue phosphor dots or strips thereon, and a shadow mask provided inside the vacuum enclosure at a predetermined distance from the phosphor screen, and means for emitting electron beams onto the phosphor screen, the improvement wherein the red phosphor dots or strips are particles of europium-activated yttrium oxide ($Y_2O_3$:Eu) having thereon a thin protective coating layer of europium-activated yttrium oxysulfide ($Y_2O_2S$:Eu) which particle layers when excited both emit a uniform red light.

2. In a cathode ray tube having a vacuum enclosure, a phosphor screen provided in the inner face of a face plate contained within the vacuum enclosure, the phosphor screen provided with a plurality of red, green and blue phosphor dots or strips thereon, and a shadow mask provided inside the vacuum enclosure at a predetermined distance from the phosphor screen and means for emitting electron beams onto the phosphor screen, the improvement wherein the red phosphor dots or strips are particles of europium-activated yttrium oxide ($Y_2O_3$:Eu) having thereon a thin protective coating layer of between 0.5 and 2.0 microns in thickness of europium-activated yttrium oxysulfide ($Y_2O_2S$:Eu) which particle layers when excited both emit a uniform red light.

* * * * *